(12) United States Patent
Poberezhskiy et al.

(10) Patent No.: US 12,135,378 B2
(45) Date of Patent: Nov. 5, 2024

(54) STANDALONE GNSS ANTI-JAM NULLER-BEAMFORMER COMBINING SFAP AND STAP

(71) Applicant: Raytheon Company, Tewksbury, MA (US)

(72) Inventors: Gennady Y. Poberezhskiy, Hermosa Beach, CA (US); Edward M. Jackson, Long Beach, CA (US); Brian R. Gonzales, Hermosa Beach, CA (US); Jarrett M. Perry, Manhattan Beach, CA (US); William K. Wallace, Redondo Beach, CA (US); Paul H. Grobert, Granada Hills, CA (US); Matthew P. Salkin, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 18 days.

(21) Appl. No.: 17/645,505

(22) Filed: Dec. 22, 2021

(65) Prior Publication Data

US 2023/0194728 A1   Jun. 22, 2023

(51) Int. Cl.
*G01S 19/21* (2010.01)
*H04B 7/08* (2006.01)
*H04K 3/00* (2006.01)

(52) U.S. Cl.
CPC ............ *G01S 19/21* (2013.01); *H04B 7/0842* (2013.01); *H04K 3/224* (2013.01); *H04K 3/90* (2013.01)

(58) Field of Classification Search
None
See application file for complete search history.

(56) References Cited

U.S. PATENT DOCUMENTS 5,872,540 A * 2/1999 Casabona ............... G01S 1/045
455/283
6,327,298 B1   12/2001 Grobert
(Continued)

FOREIGN PATENT DOCUMENTS

WO   2023122141   6/2023

OTHER PUBLICATIONS

Page et al., "Improving STAP Performance in Bistatic Space-Based Radar Systems Using an Efficient Expectation-Maximization Technique;" Proceedings of the 2005 IEEE International Radar Conference; May 9-12, 2005; 6 Pages.
(Continued)

*Primary Examiner* — Whitney Moore
(74) *Attorney, Agent, or Firm* — Schwegman Lundberg & Woessner, P.A.

(57) ABSTRACT

A method and apparatus for providing a standalone anti jamming (AJ) nuller-beamformer. Signals from an antenna array include a sum of Global Navigation Satellite System (GNSS) signals and jamming signals from a plurality of spatial sources. A front end is configured to amplify, filter, down-convert, and sample the input signals which are then filtered, down-converted, and decimated prior to frequency-domain and time-domain partitioning. Weights are computed and applied for spatial nulling of jamming signals in each frequency bin for the partitioned signals. Frequency and time-domain reconstruction generates a reconstructed signal with suppressed jamming.

20 Claims, 7 Drawing Sheets

(56) References Cited

U.S. PATENT DOCUMENTS

| | | | | |
|---|---|---|---|---|
| 6,961,017 B1* | 11/2005 | Naylor | ............... | H04K 3/90 |
| | | | | 342/357.29 |
| 6,980,614 B2 | 12/2005 | Miller et al. | | |
| 7,440,988 B2* | 10/2008 | Grobert | ............... | G01S 19/21 |
| | | | | 708/300 |
| 7,508,339 B1* | 3/2009 | McDowell | ............ | G01S 19/21 |
| | | | | 342/358 |
| 7,873,095 B1 | 1/2011 | Stockmaster | | |
| 8,301,677 B2 | 10/2012 | Grobert | | |
| 9,876,562 B2 | 1/2018 | Hall | | |
| 10,243,761 B1 | 3/2019 | Stockmaster et al. | | |
| 10,545,246 B1* | 1/2020 | Johnston | ............ | G01S 19/21 |
| 10,725,182 B2* | 7/2020 | Boyer | ............... | G01S 19/215 |
| 11,366,232 B2* | 6/2022 | Ryba | ............... | G01S 19/18 |
| 2005/0228841 A1* | 10/2005 | Grobert | ............... | H01Q 3/30 |
| | | | | 708/422 |
| 2005/0259760 A1* | 11/2005 | Casabona | ............ | G01S 19/21 |
| | | | | 375/E1.023 |
| 2006/0194544 A1* | 8/2006 | Struckman | ........ | H04B 7/0854 |
| | | | | 455/67.11 |
| 2020/0241145 A1* | 7/2020 | Zarowski | ............ | G01S 19/246 |
| 2021/0011120 A1* | 1/2021 | Dafesh | ............... | H04B 1/1036 |

OTHER PUBLICATIONS

PCT International Search Report and Written Opinion dated May 15, 2023 for International Application No. PCT/US2022/053592; 12 Pages.

Hatke, "Adaptive Array Processing for Wideband Nulling in GPS Systems;" Proceedings of IEEE Asilomar Conference; Nov. 1, 1998; pp. 1332-1336; 5 Pages.

Van Trees, *Optimum Array Processing*, Part IV of Detection, Estimation, and Modulation Theory; "Chapter 6: Optimum Waveform Estimation;" Jan. 2002; 282 Pages.

Van Trees, *Optimum Array Processing*, Part IV of Detection, Estimation, and Modulation Theory; "Chapter 7: Adaptive Beamformers;" Jan. 2002; 207 Pages.

"International Application Serial No. PCT US2022 053592, International Preliminary Report on Patentability mailed Jul. 4, 2024", 8 pgs.

* cited by examiner

STANDALONE GNSS ANTI-JAM NULLER-BEAMFORMER COMBINING SFAP AND STAP

FIELD

The present disclosure relates generally to electronic systems and methods that protect receivers from jamming using antenna arrays. In particular, it relates to systems and methods for protecting Global Navigation Satellite System (GNSS) receivers.

BACKGROUND

Adaptive array-based anti jam (AJ) devices protecting receivers from jamming have been used in communication, navigation, radar, and other fields. The devices that use arrays to adaptively form spatial nulls in the directions of jammers are known in the art as nullers. Array-based devices that form spatial beams in the directions of transmitters of the desired signals are known in the art as beamformers. Array-based devices that combine both functions are known in the art as nuller-beamformers.

In navigation, it is known that AJ nuller-beamformers can be used for GNSS receivers. For higher AJ performance, many such nuller-beamformers create separate spatial beams for different GNSS satellites.

The depth of the spatial nulls towards jammers largely determines the AJ performance of nullers and nuller-beamformers. One of the factors limiting this performance is the influence of frequency-dependent gain and phase mismatches among the array elements and subsequent analog signal paths, To compensate this influence, space-frequency adaptive processing (SFAP) and space-time adaptive processing (STAP) techniques have been utilized. Since the SFAP and STAP realizations of the same complexity are better suited for different types of mismatches, a combination of SFAP with STAP, known as SFAP-T, is often most effective and efficient, especially for small arrays. Typically, SFAP-T augments SFAP with STAP in each frequency bin.

Known AJ GNSS units that use SFAP-T processing can provide AJ performance. However, the technical solutions used in these embodiments make the nuller-beamformer inseparable from the rest of a GNSS receiver, in algorithm and implementation, which prevents modular realization of AJ GNSS units.

Therefore, there is a need in the art for a standalone SFAP-T nuller-beamformer that is separable from a GNSS receiver in both algorithm and implementation and has AJ performance as well as size, weight, power, and cost (SWAP-C) similar to or better than the units based on the aforementioned patents.

SUMMARY

Embodiments of the disclosure provide methods and apparatus for a SFAP-T nuller-beamformer that is self-contained and separable from receiver and may have independent product life cycles. Embodiments of the disclosure may provide AJ performance similar to or better than other known SFAP-T systems and may have optional front-end and back-end blocks supporting the core SFAP-T nulling & beamforming functions and their integration with GNSS receivers.

In one aspect, a standalone anti jamming (AJ) nuller-beamformer comprises: an antenna array containing a plurality of antennas configured to receive an input signal that includes a sum of Global Navigation Satellite System (GNSS) signals and jamming signals from a plurality of spatial sources; an analog and mixed signal front end to amplify, filter, down-convert, and sample the input signals of the antennas of the array; a digital front end to filter, down-convert, and decimate the input signals of the antennas of the array; a frequency and time-domain partitioning module configured to perform frequency-domain and time-domain partitioning of the input signals of the antennas of the array; a weight calculator module to calculate weights for spatial nulling of jamming signals in each frequency bin for the partitioned signals; a weight application module to apply the weights to the partitioned signals from the antennas and time taps in each frequency bin; a frequency and time-domain reconstruction module to sum the weighted signals from the antennas and the time taps in each frequency bin and perform frequency-domain reconstruction to generate a reconstructed signal with suppressed jamming; and a sampling rate conversion module to convert a sampling rate of the reconstructed signal to a sampling rate for the digital input(s) of one or more GNSS receivers.

In another aspect, a method comprises: for a standalone anti jamming (AJ) nuller-beamformer, comprising: receiving, by an antenna array containing a plurality of antennas, an input signal that includes a sum of Global Navigation Satellite System (GNSS) signals and jamming signals from a plurality of spatial sources; amplifying, filtering, down-converting, and sampling the input signals of the antennas of the array by an analog and mixed signal front end; filtering, down-converting, and decimating the input signals of the antennas of the array by a digital front end; frequency-domain and time-domain partitioning of the input signals of the antennas of the array by a frequency and time-domain partitioning module; calculating weights for spatial nulling of jamming signals in each frequency bin for the partitioned signals by a weight calculator module; applying the weights to the partitioned signals from the antennas and time taps in each frequency bin by a weight application module; summing the weighted signals from the antennas and the time taps in each frequency bin and performing frequency-domain reconstruction to generate a reconstructed signal with suppressed jamming by a frequency and time-domain reconstruction module; and converting a sampling rate of the reconstructed signal to a sampling rate for the digital input(s) of one or more GNSS receivers by a sampling rate conversion module.

BRIEF DESCRIPTION OF THE DRAWINGS

The foregoing features of this disclosure may be more fully understood from the following description of the drawings in which.

DETAILED DESCRIPTION

Figure 1:
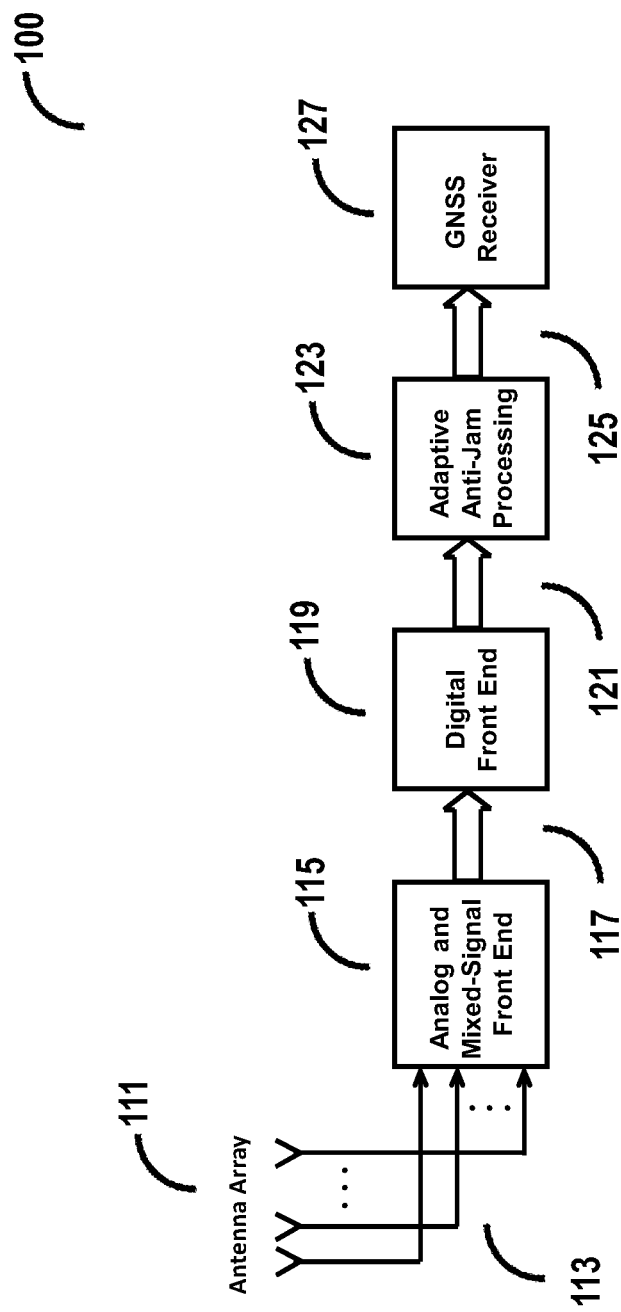
FIG. 1 is a high level block diagram of example signal flow in a GNSS unit combining array-based AJ nuller-beamformer with a subsequent GNSS receiver.

FIG. 1 shows example signal flow in an AJ GNSS unit combining array-based AJ nuller-beamformer with a subsequent GNSS receiver in accordance with example embodiments of the disclosure. An input signal, which is a sum of desired signals, jamming, and receiver noise, is received by M antenna elements of the antenna array 111. The M-channel analog signal 113 is filtered, down-converted, and digitized in the analog and mixed-signal front end 115. The M-channel digital signal 117 can be further down-converted to baseband, filtered, and decimated in the digital front end 119. The M-channel baseband complex-valued digital signal 121 undergoes adaptive array AJ processing 123 that performs weighted combining of the antenna channels. This combining is optimized for spatial nulling of the jamming while maintaining an appropriate level of desired signals. The computation of proper weights for the combining is also performed as part of AJ processing 123 using the samples of signal 121 and optionally some external information. The output signal 125 of the nuller-beamformer with increased signal-to-jamming ratio is sent to the GNSS receiver 127. The number of channels of signal 125 can vary from one for a nuller to the number of beams for a nuller-beamformer. The standalone GNSS nuller-beamformer described in this disclosure can contain, in addition to block 125, also blocks 119, 115, and 111.

Figure 2:
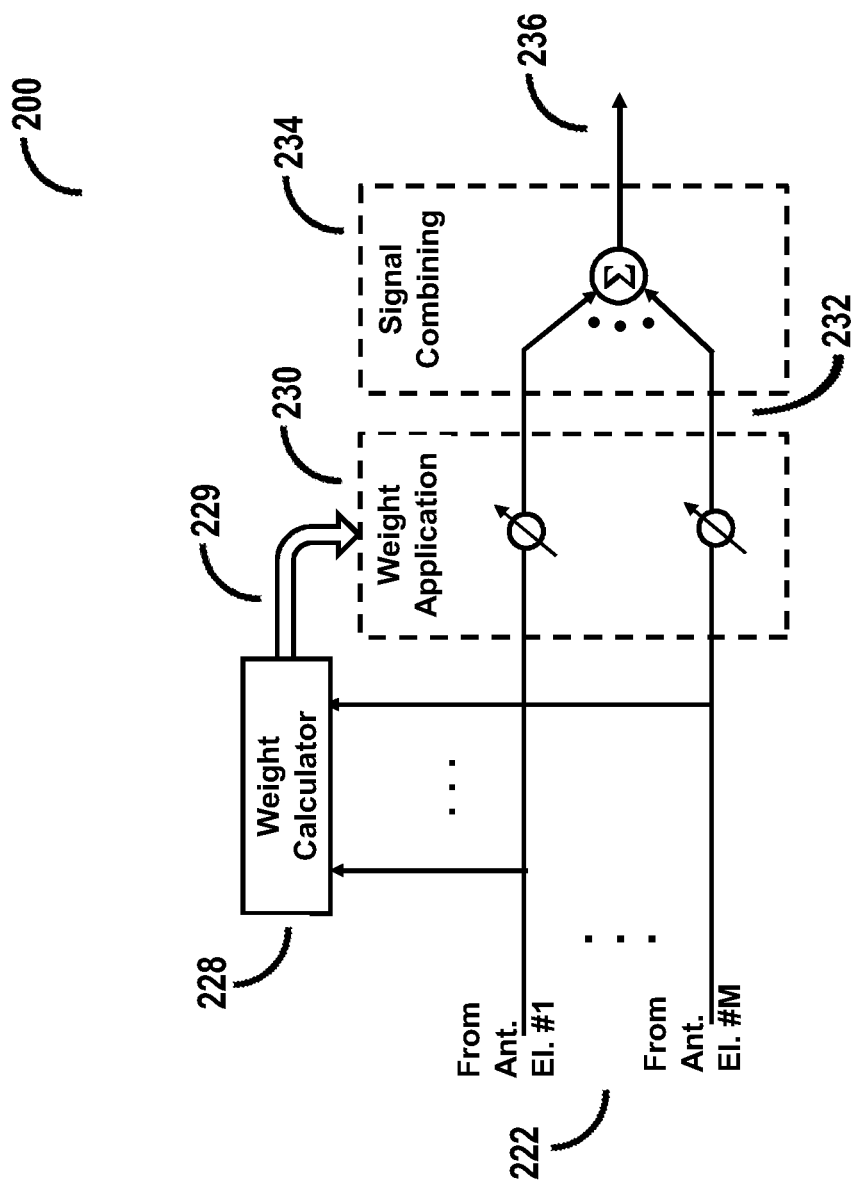
FIG. 2 is a block diagram illustrating example adaptive array processing.

FIG. 2 shows an example embodiment of adaptive array processing. The M-channel digitized, down-converted, and decimated input signal 222, which can be an equivalent of signal 121 in FIG. 1, is sent to the input of weight calculator 228 for periodically calculating M optimal or near-optimal weights for the linear weighted combining of the antenna channels of signal 222 with the purpose of nulling the jamming, possibly with beamforming to the GNSS signal sources (typically satellites). Example algorithms for weight calculation include, but are not limited to, minimum variance (MV), minimum variance distortionless response (MVDR) algorithms, and the like. The output weights 229 are applied to incoming samples of the corresponding channels of signal 222 in a weight application module 230. The weighted signal 232 enters the signal combining module 234 where the weighted components of signal 232 are summed, creating a combined signal 236 in which the jamming power is reduced compared to the desired signal power.

In the diagram shown in FIG. 2, each output sample s is a weighted sum of the corresponding samples in all antenna channels, where s can be computed as set forth below as:

$$s = w^H s \quad (1)$$

where $s=[s_1 \ldots s_M]^T$ is the M×1 input sample vector and $w^H=[w^*_1 \ldots w^*_M]$ is the 1×M weight vector.

An optimal weight vector, as set forth below, can be calculated according to the aforementioned MVDR algorithm minimizes the output jamming power while satisfying the linear constraint $$w^H v = 1 \quad (2)$$

where v is a M×1 steering vector towards a GNSS satellite, with its elements representing the gains of the corresponding array elements in the satellite's direction. This constraint ensures the unit gain in the direction specified by v. An MVDR weight vector solution is $$w^H = v^H R^{-1}/(v^H R^{-1} v) \quad (3)$$

where R is the M×M spatial covariance matrix of input signal samples in the antenna channels.

Different beams require different steering vectors v (and therefore different resulting weight vectors w), whereas the covariance matrix R can be the same.

Other weight optimization algorithms besides MVDR may also be used.

Figure 3:
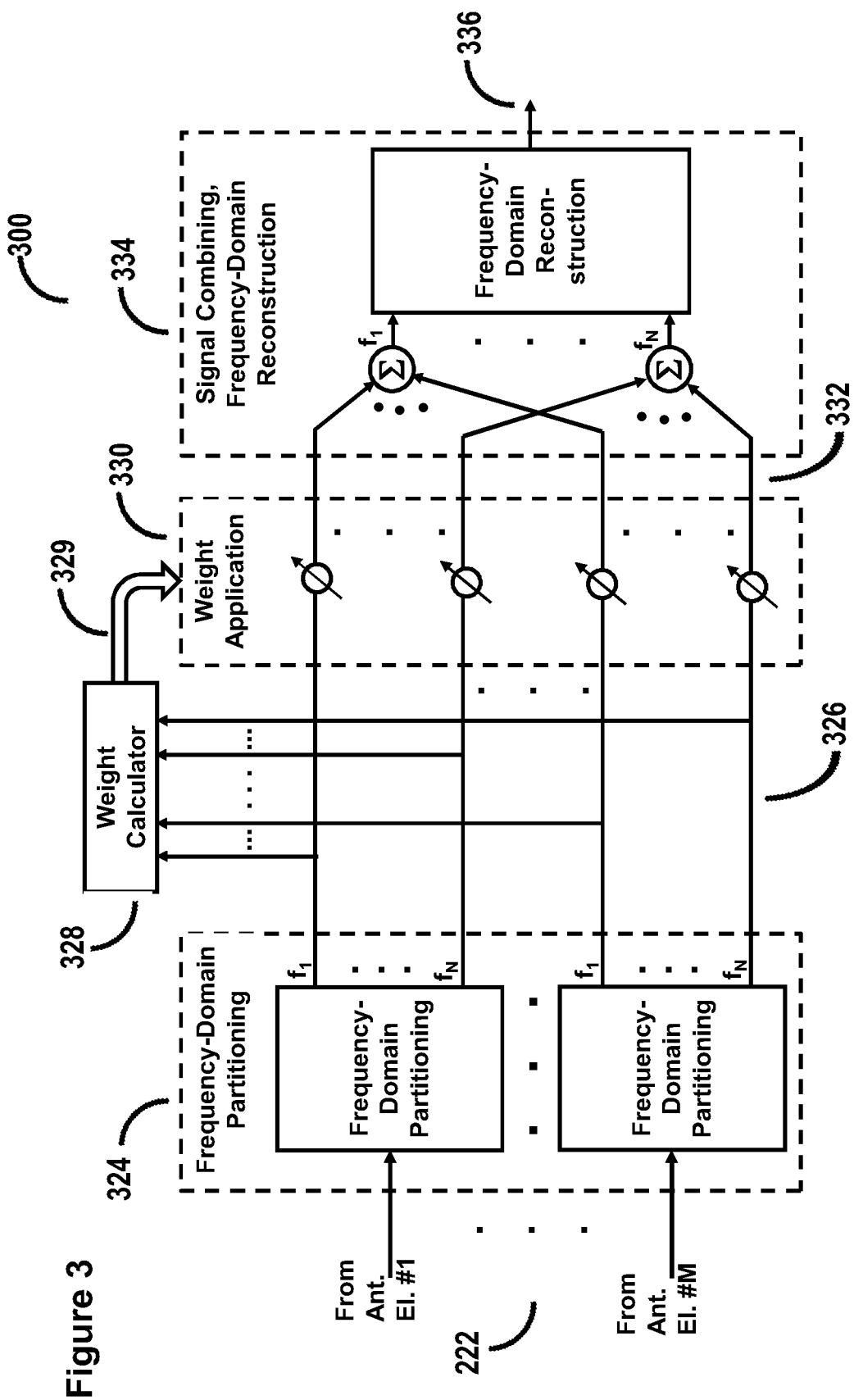
FIG. 3 is a block diagram illustrating example SFAP.

FIG. 3 provides an example embodiment of SFAP. The incoming signal 222 enters the frequency-domain partitioning module 324 where it is separated into N frequency subbands, also known as frequency bins. In embodiments, module 324 has N×M output channels to accommodate components of the output signal 326. Each of N frequency components of signal 326 independently undergoes the adaptive processing illustrated in FIG. 2, with weight calculator 328 computing an M-element weight vector according to equation (3) for each of N frequency bins during each weight update period. A signal combining/reconstruction module 334 performs summation of the weighted antenna channels in each frequency bin and frequency-domain reconstruction of the whole signal from N frequency components, creating the output signal 336.

In embodiments, SFAP increases the AJ performance for all types of frequency-dependent mismatch among the array antennas and their analog channels. In particular, it is effective against frequency-domain gain and phase ripple mismatch.

Figure 4:
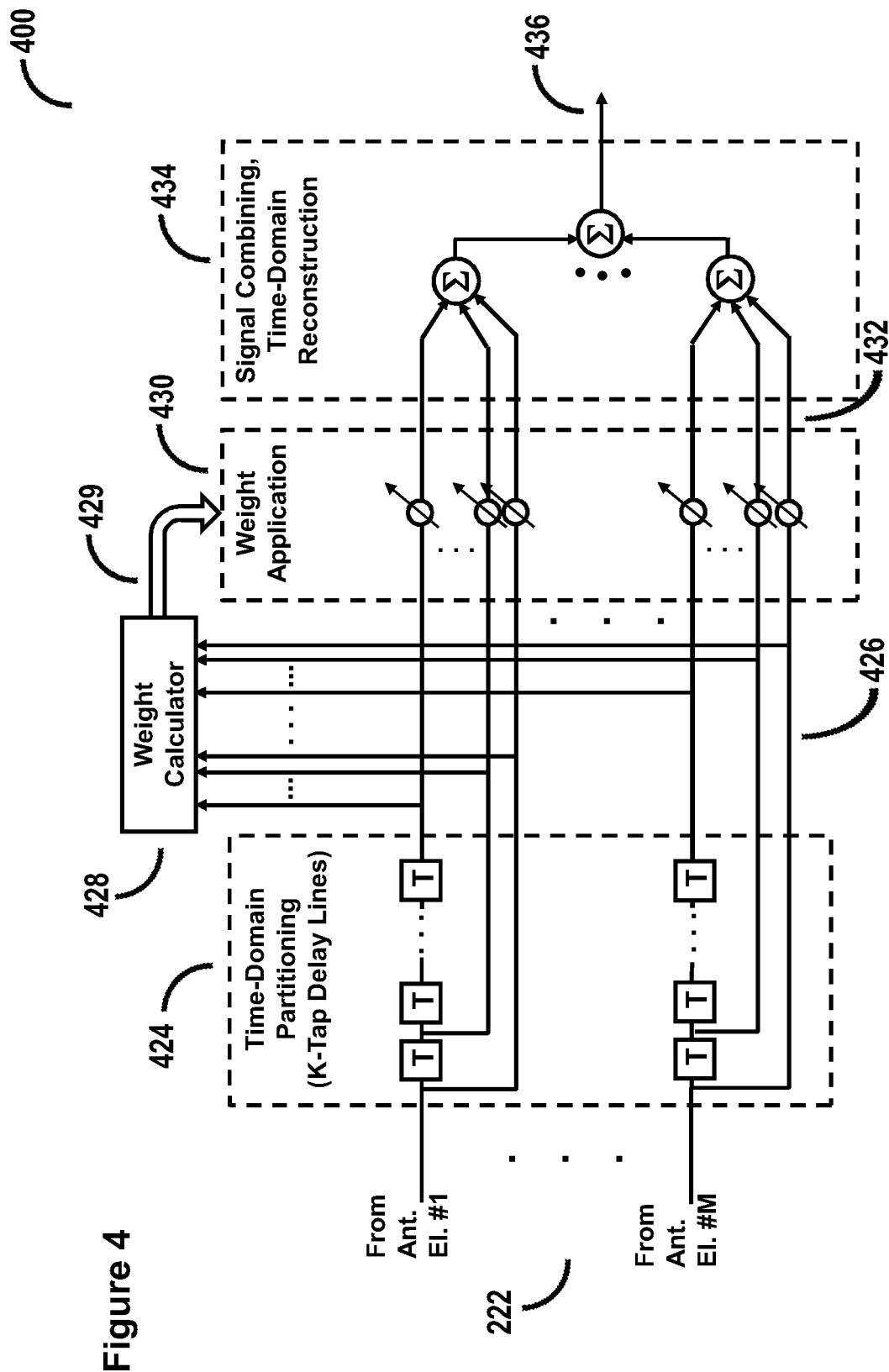
FIG. 4 is a block diagram illustrating example STAP.

FIG. 4 provides as example embodiment of STAP. In a partitioning module 424, the incoming signal 222 channel passes through a tapped delay line with K taps, which will be referred to as time-domain partitioning. In example embodiments, the partitioning output has K×M channels to accommodate components of output signal 426, which undergoes adaptive processing that may be similar to that illustrated in FIG. 2 but with higher dimensionality. A weight calculator module 428 computes KM weights 429 during each weight update period. The algorithms for STAP weight calculation include, but are not limited to, linear constrained minimum variance (LCMV) algorithm and the like. The combining/reconstruction module 434 sums the weighted taps in the antenna channels, and performs signal combining and time-domain reconstruction.

Signal combining according to STAP in FIG. 4 is still described by equation (1), but in this case the input sample vector $s=[s_{11} \ldots s_{M1} \ldots s_{1K} \ldots s_{MK}]^T$ has dimensions KM×1 and weight vector $w^H=[w^*_{11} \ldots w^*_{M1} \ldots w^*_{1K} \ldots w^*_{MK}]$ has dimensions 1×KM.

An example optimal weight vector calculated according to the aforementioned LCMV algorithm minimizes the output jamming power while satisfying the linear constraint $$w^H C = g^H \quad (4)$$

This constraint can maintain a desired impulse response $g^H$ in the direction of a GNSS satellite specified by steering vector v. In this case, $g^H$ is 1×K vector and C is the KM×K matrix calculated as $C = I \otimes v$ where v the M×1 steering vector, I is the K×K identity matrix, and $\otimes$ designates Kroneker product.

An example LCMV weight vector solution can be computed as:

$$w^H = g^H (C^H R^{-1} C) C^H R^{-1} \quad (5)$$

where R is the KM×KM space-time covariance matrix of input signal samples in all taps of all antenna channels.

Different beams require different steering vectors v (and therefore different matrices C and resulting weight vectors w), whereas the covariance matrix R can be the same.

LCMV algorithm may be modified to include other types of hard and soft constraints. Other weight optimization algorithms besides LCMV may also be used.

In embodiments, STAP increases the AJ performance for all types of frequency-dependent mismatch among the array antennas and their analog channels, being particularly effective against delay mismatch (which manifests as a frequency-domain phase slope), even if K is small.

Figure 5:
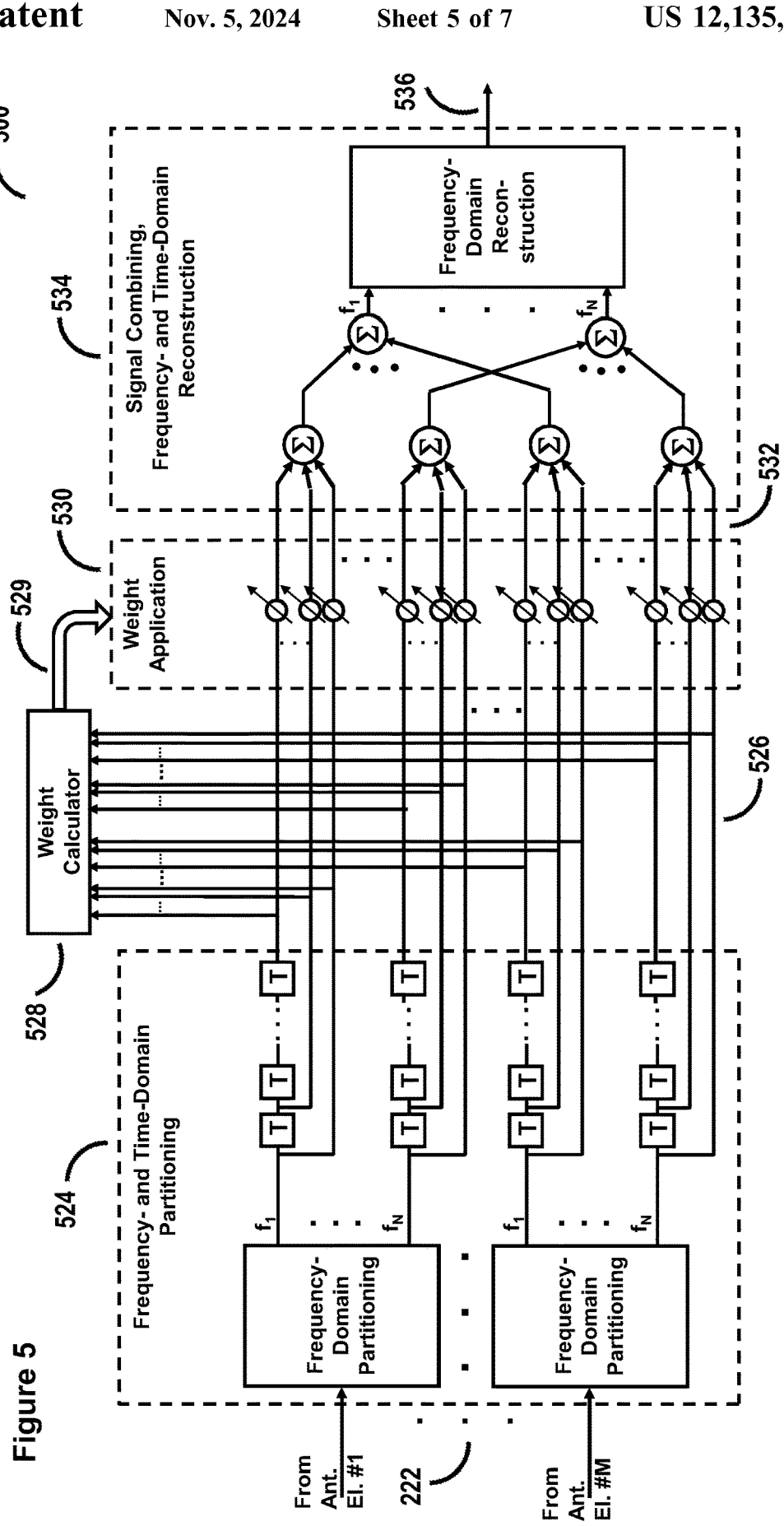
FIG. 5 is a block diagram illustrating an example implementation of a combination of SFAP and STAP known as SFAP-T.

FIG. 5 provides an example illustration of SFAP-T processing combining SFAP and STAP as illustrated in FIGS. 3 and 4, respectively. The input signal 222 undergoes both frequency-domain and time-domain partitioning in a partitioning module 524, and the subsequent processing is essentially STAP (illustrated in FIG. 4) in each frequency bin. Weight calculator 528 computes N weight vectors (one per frequency bin), each consisting of KM elements. Weight application module 530 applies the weights 529 to the partitioned signals, as described above. A combining/reconstruction module 534 performs signal combining of the weighted signals together with time-domain and frequency-domain reconstruction to generate the output signal 536.

Figure 6:
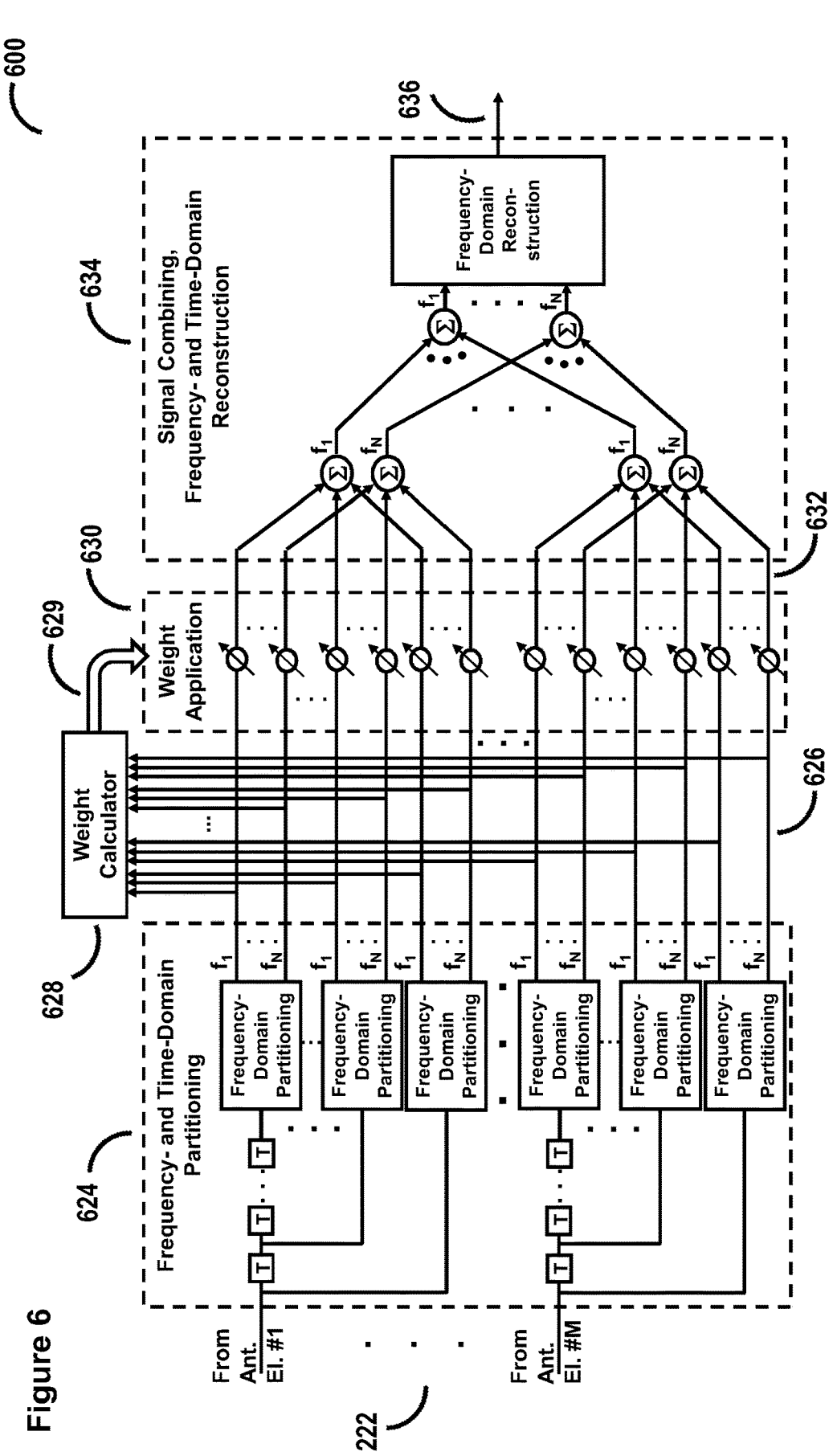
FIG. 6 is a block diagram illustrating another example implementation of a combination of SFAP and STAP known as SFAP-T.

In FIG. 5, frequency-domain partitioning in block 524 precedes time-domain partitioning. For practical purposes, both these operations can be considered linear and time-invariant. Therefore, they may be performed in any order (same is true about reconstruction in block 534). The choice of the order depends on design considerations. For example, frequency-domain partitioning is often combined with signal decimation in each frequency bin. While this decimation reduces the throughput requirements, it can make time-domain partitioning more granular. If fine precision of time-domain partitioning is desired, it is often better to perform it before frequency-domain partitioning. Such an implementation of SFAP-T is illustrated in FIG. 6. The reconstruction order is also selected based on practical considerations and does not necessarily depend on the partitioning order.

In the system 600 of FIG. 6, as can be seen in the partitioning module 624, time-domain partitioning is performed prior to frequency-domain partitioning. A weight calculator module 628 generates weights 629 and a weight application module 630 applies the weights to the partitioned signals 626. A combining/reconstruction module 634 performs signal combining of the weighted signals together with time-domain and frequency-domain reconstruction to generate the output signal 636.

In embodiments, SFAP-T is very effective against both delay and ripple mismatch (as well as any other type of frequency-dependent mismatch among the array antennas and their analog channels) due to combining the advantages of SFAP and STAP.

Figure 7:
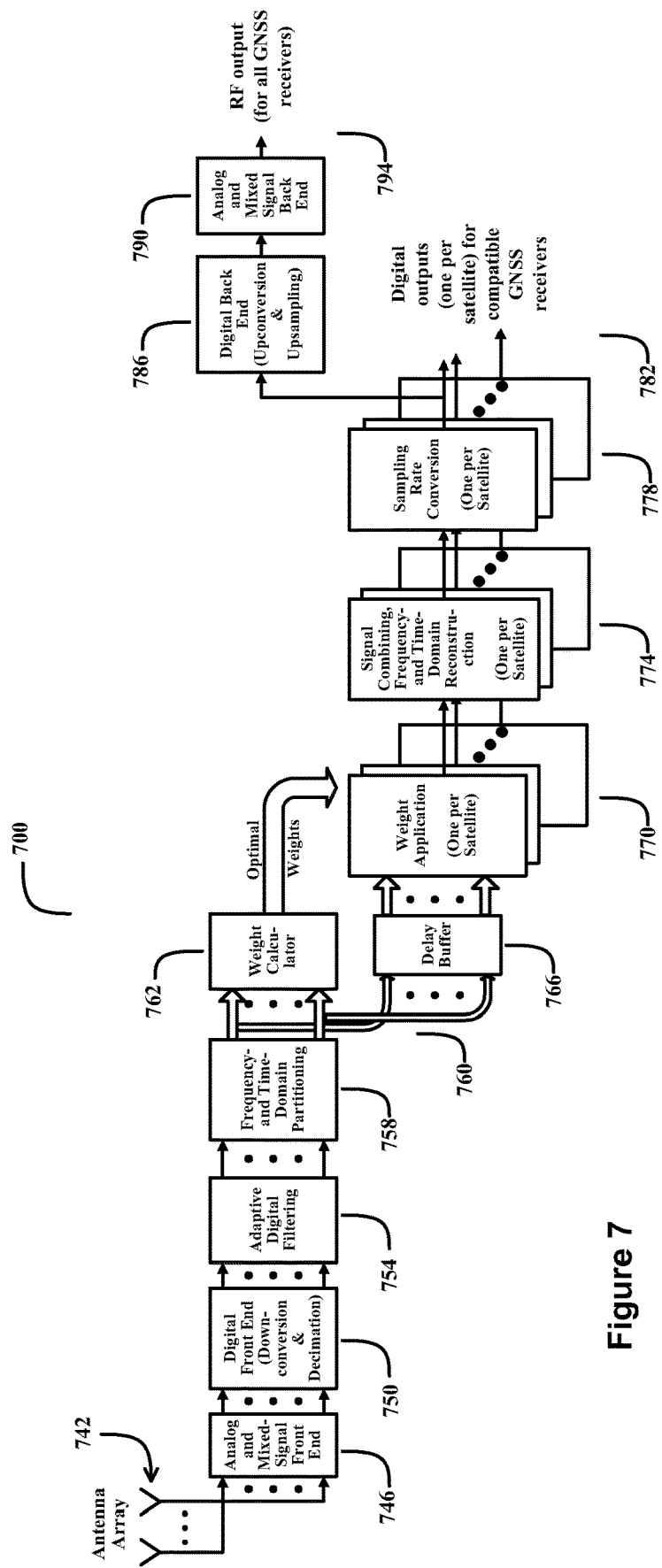
FIG. 7 is a block diagram of a nuller-beamformer illustrating the example embodiments of the disclosure.

FIG. 7 shows an example of a standalone GNSS AJ nuller-beamformer 700 in accordance with example embodiments of the disclosure. In embodiments, the nuller-beamformer is self-contained and independent of, and separable from, the GNSS receiver. In embodiments, SFAP and STAP processing are combined to provide SFAP-T processing. In embodiments, SFAP processing is augmented with STAP processing in each frequency bin.

Antenna array 742 is coupled to an analog and mixed signal front end 746, whose outputs are processed in the digital front end 750. In some embodiments, the output signals of the digital front end 750 are filtered in an optional adaptive digital filter 754, which suppresses jamming with low spectral overlap with GNSS signals. Subsequently, the signals enter a frequency- and time-domain partitioning module 758, which performs frequency-domain and time-domain partitioning of the signals, as illustrated by block 524 of FIG. 5 or block 624 of FIG. 6, for example. The partitioned signals 760 are used in the weight calculator 762 to compute the optimal weights for jamming nulling in each frequency bin. In some embodiments, these weights are also optimized for beamforming. In some embodiments, separate sets of such weights are computed for different GNSS satellites to provide optimal beamforming for each satellite. The partitioned signals 760 are also sent to the weight application module 770, in some embodiments through a delay buffer 766. In some embodiments, separate weight sets are applied to the partitioned signals for processing in different GNSS satellite channels. The subsequent signal combining, frequency and time-domain reconstruction module 774 reconstructs the whole signal with suppressed jamming. In some embodiments, separate reconstruction is performed for signals in different GNSS satellite channels. The reconstructed signal(s) undergo sampling rate conversion 778 to make sure that the output sampling rate of the nuller-beamformer matches the sampling rate of the digital input(s) of GNSS receivers. The resulting signal(s) are sent to the digital output(s) 782 of the nuller-beamformer. Depending on the embodiment, the number of digital outputs can vary from one to the number of GNSS satellite channels. In some embodiments, one of the reconstructed signals can be also sent to the digital back end 786 and subsequently to the analog and mixed signal back end 790 for upsampling, digital-to-analog conversion, and conversion to RF. The RF output 794 can be connected to the antenna inputs of GNSS receivers, even if these receivers do not have digital inputs compatible with the nuller-beamformer's digital output(s) 782.

In some embodiments, frequency-domain partitioning in block 758 and reconstruction in block 774 can use techniques based on fast Fourier transform (FFT) and inverse fast Fourier transform (IFFT), respectively. Such techniques can include weighted overlap & add (WOLA) FFT banks and polyphase filter banks.

In embodiments, LCMV beamforming algorithm described above can be used in the weight calculator module 762 for each frequency bin. The constraints can be different in each frequency bin.

A simplified LCMV beamforming algorithm can apply the constraints similar to (4) only to weights for selected temporal taps. Benign behavior of the weights for other temporal taps can be ensured by other means, e.g., soft constraints applied to the space-time covariance matrix. Other suitable types of constraints, as well as other algorithms besides LCMV may be used.

The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A standalone anti jamming (AJ) nuller-beamformer, comprising:
   an antenna array comprising a plurality of antennas configured to receive an input signal that includes a sum of Global Navigation Satellite System (GNSS) signals and jamming signals from a plurality of spatial sources;
an analog and mixed signal front end to amplify, filter, down-convert, and sample the input signals of the antennas of the array;
a digital front end to filter, down-convert, and decimate the input signals of the antennas of the array;
frequency and time-domain partitioning circuitry configured to perform combined frequency-domain and time-domain partitioning of the input signals of the antennas of the array;
weight calculator circuitry to calculate weights for each of the time taps in frequency bins for each antenna channel for spatial nulling of jamming signals in each frequency bin for the partitioned signals;
weight application circuitry to apply the weights to the partitioned signals from the antennas and time taps in each of the frequency bins;
frequency and time-domain reconstruction circuitry to sum the weighted signals from the antennas and the time taps in each frequency bin and perform frequency-domain reconstruction to generate a reconstructed signal with suppressed jamming; and
sampling rate conversion circuitry to convert a sampling rate of the reconstructed signal to a sampling rate for the digital input(s) of one or more GNSS receivers.

2. The standalone AJ nuller-beamformer of claim 1, further including a delay buffer block, wherein the signals from the frequency and time-domain partitioning circuitry are delayed in the delay buffer block before being sent to the weight application circuitry.

3. The standalone AJ nuller-beamformer of claim 1, further including adaptive digital filtering circuitry, wherein the signals from the digital front end, prior to the frequency and time-domain partitioning, are processed in the adaptive digital filtering circuitry for suppression of jamming that has low spectral overlap with the GNSS signal.

4. The standalone AJ nuller-beamformer of claim 1, wherein the weight calculator circuitry is configured to compute a separate set of weights for each GNSS satellite whose signals are being processed, with the weights in each set of weights configured to maximize the signal-to-jamming ratio for the corresponding satellite, and wherein the weight application circuitry and the frequency and the time-domain reconstruction circuitry are configured to perform the weight application and signal reconstruction separately for each of the GNSS satellites.

5. The standalone AJ nuller-beamformer of claim 4, wherein the sampling rate conversion circuitry is configured to perform sampling rate conversion of the reconstructed signals for different satellites to generate a plurality of digital outputs.

6. The standalone AJ nuller-beamformer of claim 4, wherein one of the digital output signals with suppressed jamming is converted to an analog RF signal and sent to an analog RF output for compatibility with GNSS receivers.

7. The standalone AJ nuller-beamformer of claim 4, wherein the weight calculator circuitry is configured to execute for each satellite in each of the frequency bins linear constrained minimum variance (LCMV) beamforming processing.

8. The standalone AJ nuller-beamformer of claim 1, wherein the frequency and time domain partitioning are linear and time-invariant and can be performed in any order.

9. The standalone AJ nuller-beamformer of claim 1, wherein an order of the frequency and time-domain reconstruction is selectable.

10. The standalone AJ nuller-beamformer of claim 1, wherein the weights for each of the time taps for spatial nulling of jamming signals are optimized for beamforming.

11. The standalone AJ nuller-beamformer of claim 1, wherein the weights comprise separate sets of weights for different GNSS satellites.

12. The standalone AJ nuller-beamformer of claim 1, wherein the frequency and time-domain reconstruction circuitry is configured to perform separate reconstruction for signals in different GNSS satellite channels.

13. The standalone AJ nuller-beamformer of claim 12, wherein the separate reconstruction signals are sampling rate converted to match sampling rates of the different GNSS satellite channels.

14. A method: performed by a standalone anti-jamming (AJ) nuller-beamformer, the method comprising:
receiving, by an antenna array comprising a plurality of antennas, an input signal that includes a sum of Global Navigation Satellite System (GNSS) signals and jamming signals from a plurality of spatial sources;
amplifying, filtering, down-converting, and sampling the input signals of the antennas of the array by an analog and mixed signal front end;
filtering, down-converting, and decimating the input signals of the antennas of the array by a digital front end;
combined frequency-domain and time-domain partitioning of the input signals of the antennas of the array by frequency and time-domain partitioning circuitry;
calculating weights for each of the time taps in each of the frequency bins for each antenna channel for spatial nulling of jamming signals in each frequency bin for the partitioned signals by weight calculator circuitry;
applying the weights to the partitioned signals from the antennas and time taps in each of the frequency bins by a weight application circuitry;
summing the weighted signals from the antennas and the time taps in each frequency bin and performing frequency-domain reconstruction to generate a reconstructed signal with suppressed jamming by a frequency and time-domain reconstruction circuitry; and
converting a sampling rate of the reconstructed signal to a sampling rate for the digital input(s) of one or more GNSS receivers by a sampling rate conversion circuitry.

15. The method of claim 14, further including employing a delay buffer block, wherein the signals from the frequency and time-domain partitioning circuitry are delayed in the delay buffer block before being sent to the weight application circuitry.

16. The method of claim 14, further including employing adaptive digital filtering circuitry, wherein the signals from the digital front end, prior to the frequency and time-domain partitioning, are processed in the adaptive digital filtering circuitry for suppression of jamming that has low spectral overlap with the GNSS signal.

17. The method of claim 14, wherein the weight calculator circuitry computes a separate set of weights for each GNSS satellite whose signals are being processed, with the weights in each set of weights maximizing the signal-to-jamming ratio for the corresponding satellite, and wherein the weight application circuitry and the frequency and time-domain reconstruction circuitry are configured to perform the weight application and signal reconstruction separately for each of the GNSS satellites.

18. The method of claim 17, wherein the sampling rate conversion circuitry performs sampling rate conversion of the reconstructed signals for different satellites to generate a plurality of digital outputs.

19. The method of claim 17, wherein one of the digital output signals with suppressed jamming is converted to an analog RF signal and sent to an analog RF output for compatibility with GNSS receivers.

20. The method according to claim 17, wherein the weight calculator circuitry is configured to execute for each satellite in each of the frequency bins linear constrained minimum variance (LCMV) beamforming processing.

* * * * *

UNITED STATES PATENT AND TRADEMARK OFFICE
CERTIFICATE OF CORRECTION

PATENT NO. : 12,135,378 B2
APPLICATION NO. : 17/645505
DATED : November 5, 2024
INVENTOR(S) : Poberezhskiy et al.

Page 1 of 1

It is certified that error appears in the above-identified patent and that said Letters Patent is hereby corrected as shown below:

On the Title Page

Item (57), in "Abstract", in Column 2, Lines 1-2, delete "anti jamming" and insert --anti-jamming-- therefor In the Specification In Column 1, Line 15, delete "anti jam" and insert --anti-jam-- therefor In Column 1, Line 66, delete "anti jamming" and insert --anti-jamming-- therefor In Column 2, Line 25, delete "anti jamming" and insert --anti-jamming-- therefor In the Claims In Column 6, Line 64, in Claim 1, delete "anti jamming" and insert --anti-jamming-- therefor In Column 8, Line 15, in Claim 14, delete "method:" and insert --method-- therefor In Column 8, Line 37, in Claim 14, after "by", delete "a"

In Column 8, Line 41, in Claim 14, after "by", delete "a"

Signed and Sealed this
Ninth Day of December, 2025

John A. Squires
*Director of the United States Patent and Trademark Office*